United States Patent
Guo et al.

(10) Patent No.: US 9,182,623 B2
(45) Date of Patent: Nov. 10, 2015

(54) LIQUID CRYSTAL DISPLAY AND MANUFACTURING METHOD THEREOF

(71) Applicant: Beijing BOE Optoelectronics Technology Co., Ltd., Beijing (CN)

(72) Inventors: Renwei Guo, Beijing (CN); Dong Chen, Beijing (CN)

(73) Assignee: BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 3 days.

(21) Appl. No.: 14/011,126

(22) Filed: Aug. 27, 2013

(65) Prior Publication Data

US 2014/0078446 A1 Mar. 20, 2014

(30) Foreign Application Priority Data

Aug. 28, 2012 (CN) .......................... 2012 1 0311686

(51) Int. Cl.
*G02F 1/1334* (2006.01)
*G02F 1/1333* (2006.01)
*G02F 1/137* (2006.01)

(52) U.S. Cl.
CPC ............ *G02F 1/1334* (2013.01); *G02F 1/1333* (2013.01); *G02F 2001/13345* (2013.01); *G02F 2001/13775* (2013.01)

(58) Field of Classification Search
CPC ................ G02F 1/1333; G02F 1/1334; G02F 2001/13775; G02F 2001/13345
USPC ............................. 156/272.2; 349/93; 264/1.7
See application file for complete search history.

(56) References Cited

U.S. PATENT DOCUMENTS

| | | |
|---|---|---|
| 2002/0041354 A1 | 4/2002 | Noh et al. |
| 2002/0113920 A1 | 8/2002 | Kubota et al. |
| 2003/0193709 A1* | 10/2003 | Mallya et al. ............... 359/245 |
| 2005/0140617 A1 | 6/2005 | Jang et al. |
| 2005/0185131 A1 | 8/2005 | Miyachi et al. |
| 2005/0200800 A1* | 9/2005 | Makimoto et al. ........... 349/187 |
| 2005/0264737 A1 | 12/2005 | Kataoka et al. |
| 2006/0009579 A1 | 1/2006 | Miyawaki et al. |
| 2007/0116901 A1* | 5/2007 | Kubota et al. ............... 428/1.3 |
| 2011/0253936 A1* | 10/2011 | Kurisawa et al. ........ 252/299.61 |
| 2012/0120338 A1 | 5/2012 | Takeda et al. |
| 2013/0242234 A1 | 9/2013 | Guo et al. |

FOREIGN PATENT DOCUMENTS

| | | |
|---|---|---|
| CN | 1211745 A | 3/1999 |
| CN | 1359026 A | 7/2002 |
| CN | 1637477 A | 7/2005 |
| CN | 1641425 A | 7/2005 |
| CN | 1682149 A | 10/2005 |
| CN | 102629013 A | 8/2012 |

OTHER PUBLICATIONS

First Chinese Office Action dated Aug. 20, 2015; Appln. No. 201210311686.7.

* cited by examiner

*Primary Examiner* — Daniel McNally
(74) *Attorney, Agent, or Firm* — Ladas & Parry LLP

(57) ABSTRACT

A process for manufacturing a liquid crystal display panel comprises: mixing negative liquid crystals, UV polymerizable monomers, and a photoinitiator to obtain a liquid crystal mixture; sealing the liquid crystal mixture in a liquid crystal cell formed from an array substrate and an opposed substrate to form the liquid crystal display panel; and radiating the liquid crystal display panel using UV light and heating the liquid crystal panel.

9 Claims, 3 Drawing Sheets

LIQUID CRYSTAL DISPLAY AND MANUFACTURING METHOD THEREOF

CROSS REFERENCE TO RELATED APPLICATIONS

This application claims priority from Chinese National Application No. 201210311686.7 filed on Aug. 28, 2012, the contents of which are incorporated herein by reference.

BACKGROUND

Embodiments of the present disclosure relate to a liquid crystal display panel and a manufacturing method for the same.

Nematic liquid crystals are widely used in the field of liquid display. Liquid crystal molecules in nematic liquid crystal are essentially arranged in parallel. However, the centers of mass of the liquid crystal molecules are disordered, not forming a lamellar structure. The liquid crystal molecules can slip in the directions of up and down, left and right, and forward and backward, therefore the liquid crystal molecules can only remains parallel or nearly parallel to each other along the long axis. Moreover, the interaction between liquid crystal molecules is very weak. Due to the properties of the liquid crystal molecules themselves, the electrophilic groups in the liquid crystal molecules will be affected by an electric field so as to cause the rotation of the liquid crystal molecules under the action of the electric field. This is the mechanism of liquid display.

Nematic liquid crystals can be divided into positive nematic liquid crystals and negative nematic liquid crystals. When the electrophilic groups are located along the direction of the long axes of the rod-like liquid crystal molecules, if $\Delta\in$ is greater than zero ($\Delta\in$ is the dielectric constant), the liquid crystals are positive nematic liquid crystals (hereinafter briefly referred to as positive liquid crystals); and when the electrophilic groups are located along the direction of the minor axes of the rod-like liquid crystal molecules, if $\Delta\in$ is less than zero, the liquid crystals are negative nematic liquid crystals (hereinafter briefly referred to as negative liquid crystals). Under the action of an electric field, both positive and negative liquid crystals will be affected by the electric field so as to rotate. When the liquid crystal molecules of a positive liquid crystal is affected by an electric field, the liquid crystal molecules are arranged along the tangential direction of the electric field, and the long axis direction of the liquid crystal molecules is parallel to the tangential direction of the electric field. When the liquid crystal molecules of a negative liquid crystal is affected by an electric field, the liquid crystal molecules are arranged along the direction of the electric field, and the minor axis direction of the liquid crystal molecules is parallel to the direction of the electric field.

The positive liquid crystals are mainly used for liquid crystal panels of display modes such as TN (Twisted Nematic), FFS (Fringe Field Switching), IPS (In-Plane Switching), and so on, and the negative liquid crystals are mainly used for liquid crystal panels of display modes such as MVA (Multi-domain Vertical Alignment), and so on. The former requires plane alignment treatment of the substrate, and the latter requires vertical alignment treatment of the panel.

Currently, there has been no scheme in which the negative liquid crystals are applied in the liquid crystal display panels of the display modes of TN, FFS, or IPS, and so on.

SUMMARY

Based on the liquid crystal panel and the process for manufacturing the same provided in embodiments of the disclosure, the negative liquid crystals are applied in the liquid crystal display panels with the display modes of TN, FFS, or IPS, etc., to manufacture a new type of liquid crystal display panels.

In an embodiment, the disclosure provides a process for manufacturing a liquid crystal display panel comprising mixing negative liquid crystals, UV polymerizable monomers, and a photoinitiator to obtain a liquid crystal mixture; sealing the liquid crystal mixture in a liquid crystal cell formed from an array substrate and an opposed substrate to form the liquid crystal display panel; and radiating the liquid crystal display panel using UV light and heating the liquid crystal panel.

In an embodiment, the disclosure further provides a liquid crystal display panel comprising: an opposed substrate; an array substrate, which is opposed to the opposed substrate to form a liquid crystal cell; sealant, which is applied to a sealant region on the opposed substrate/array substrate, and forms an enclosure space together with the opposed substrate and the array substrate which encloses the negative liquid crystals and macromolecule network; negative liquid crystals, which are filled in the enclosure space formed from the sealant, the opposed substrate and the array substrate; and a macromolecule network, which is located in the enclosure space together with the negative liquid crystal, to anchor a long axis direction of the liquid crystal molecules.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein:

FIG. 4 shows the cross section schematic diagram of the liquid crystal display panel manufactured using negative liquid crystals according to the embodiment of the disclosure before electricity is switched on;

FIG. 5 shows the cross section schematic diagram of the liquid crystal display panel manufactured using negative liquid crystals according to the embodiment of the disclosure after electricity is switched on.

DETAILED DESCRIPTION

Figure 1:
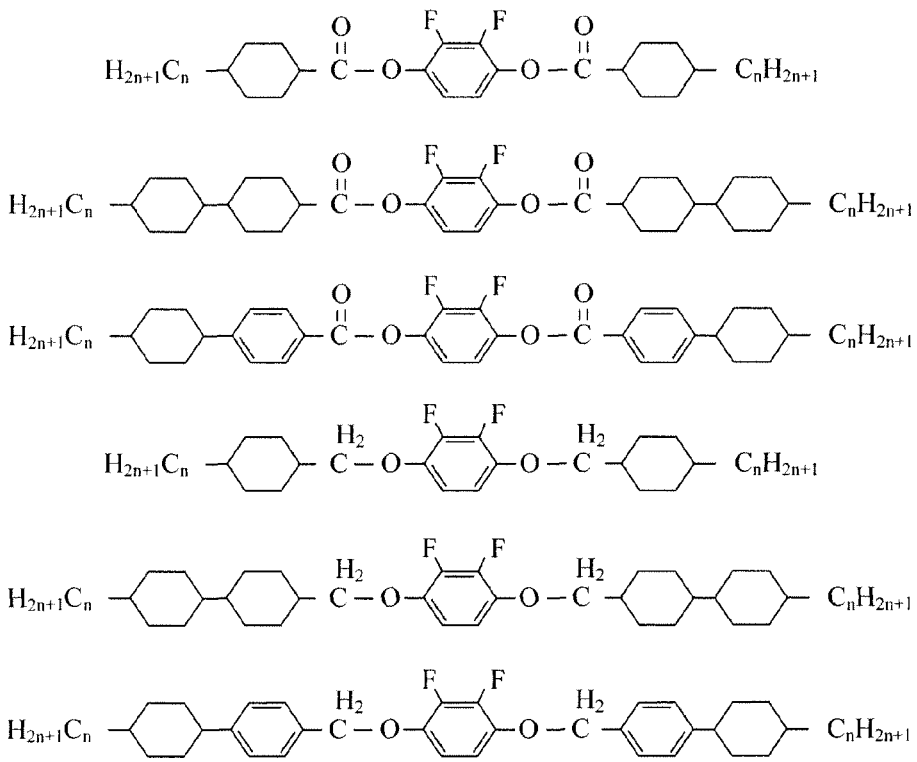
FIG. 1 shows the molecular formula of the liquid crystal molecules of the negative liquid crystals according to an embodiment of the disclosure.

In order to make the purpose, technical solution and advantage of the embodiments of the disclosure more clear, the technical solutions of the embodiments of the disclosure are described in a clear and complete manner in relation to the figures of the embodiments of the disclosure. It is apparent that the embodiments described are merely a portion of the embodiments of the disclosure, rather than all embodiments. On the basis of the described embodiments of the disclosure, any other embodiment obtained under the conditions that it can be obtained by a person of ordinary skill in the art without requiring creative work falls into the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

An embodiment of the disclosure provides a process for manufacturing a liquid crystal display panel comprising: mixing negative liquid crystals, UV polymerizable monomers, and a photoinitiator to obtain a liquid crystal mixture; sealing the liquid crystal mixture in a liquid crystal cell formed from an array substrate and an opposed substrate to form the liquid crystal display panel; and radiating the liquid crystal display panel using UV light, and heating the liquid crystal panel.

For example, the liquid crystal mixture is dripped onto the array substrate, and a sealant is coated along the sides of the opposed substrate. The array substrate is assembled with the opposed substrate to form a liquid crystal cell in vacuum, thereby sealing the liquid crystal mixture in the liquid crystal cell formed from the array substrate and the opposed substrate.

The liquid crystal display panel comprises an array substrate and an opposed substrate. The array substrate is provided opposite to the opposed substrate at a certain distance, and a liquid crystal cell is formed with sealant. Liquid crystal materials are filled in the liquid crystal cell. This opposed substrate is, for example, a color filter substrate. The pixel electrode of each pixel unit in the array substrate is used to exert an electric field to control the degree of rotation of the liquid crystal materials. In some examples, this liquid crystal display panel can also comprise a backlight source that provides backlight for the array substrate for display.

An embodiment of the disclosure provides a process for manufacturing a liquid crystal display panel comprising the following steps.

Step 101, mixing negative liquid crystals, UV polymerizable monomers, and a photoinitiator to obtain a liquid crystal mixture.

For example, the negative liquid crystals, the UV polymerizable monomers, and the photoinitiator are mixed proportionally to obtain the liquid crystal mixture, and the liquid crystal mixture can be further agitated in the condition away from light as desired.

For example, the negative liquid crystals account for 90%~98% by weight percentage of the liquid crystal mixture, the UV polymerizable monomers account for 1%~9% by weight percentage of the liquid crystal mixture, and the photoinitiator account for 0.1%~1% by weight percentage of the liquid crystal mixture.

For example, the negative liquid crystals are negative liquid crystal materials of −20° C.~90° C., in which temperature range the negative liquid crystals are in a state of liquid crystal. The negative liquid crystals may be fluoro-derivatives; the negative liquid crystals contain in their molecule structures rigid group structures such as biphenyl or diphenyl ethane, etc., the liquid crystals appear negative. The content of benzene ring in the liquid crystal molecules of the negative liquid crystals will affect the properties of the liquid crystals. The more benzene rings are in the liquid crystal molecules of the negative liquid crystals, the stronger is the rigidity of the liquid crystal molecules, and the less benzene rings are in the liquid crystal molecules, the weaker is the rigidity of the liquid crystal molecules. Too strong or too weak rigidity of the liquid crystal molecules will both affect the properties of the liquid crystals. Therefore, in an embodiment of the disclosure, for example, the number of benzene rings in a liquid crystal molecule of the negative liquid crystal is typically 2~3.

The length of the flexible chain in the liquid crystal molecules of the negative liquid crystals will also affect the properties of the liquid crystals. The shorter are the flexible chains in the liquid crystal molecules in the negative liquid crystals, the stronger is the rigidity of the liquid crystal molecules, and the longer are the flexible chains in the liquid crystal molecules, the weaker is the rigidity of the liquid crystal molecules. Too strong or too weak rigidity of the liquid crystal molecules will both affect the properties of the liquid crystals. Therefore, in an embodiment of the disclosure, for example, the number of the flexible chains in a liquid crystal molecule of the negative liquid crystal is typically 3~8.

For example, the molecular formula of the liquid crystal molecules of the negative liquid crystals can be shown in FIG. 1, in which "n" in the molecular formula can be selected from 3, 4, 5, 6, 7, and 8. The long axis of a liquid crystal molecule of the negative liquid crystal is composed of a benzene ring, a cyclohexane and an ester group. The benzene ring in the middle of the liquid crystal molecule has two fluoro functional groups on the same side of the ring. A liquid crystal of this structure has electrophilic groups on the minor axis, and thus exhibits electronegativity and is a negative liquid crystal.

Figure 2:
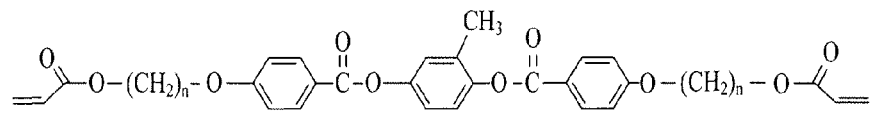
FIG. 2 shows the molecular formula of the UV polymerizable monomers according to an embodiment of the disclosure.

The content of benzene rings in the UV polymerizable monomer will affect the properties of the macromolecular network subsequently formed. The more benzene rings are in the UV polymerizable monomer, the stronger is the rigidity of the macromolecular network formed, and the less benzene rings are in the UV polymerizable monomer, the weaker is the rigidity of the macromolecular network formed. For example, the UV polymerizable monomer can be 1,4-di(4-(6'-propenyloxyhexyloxy)benzoyloxy)-2-toluene, the molecular formula of which is shown in FIG. 2, in which "n" is selected from 3, 4, 5, 6, 7, and 8. The molecular structure of the UV polymerizable monomer is similar to the structure of the rod-like liquid crystal molecule. The UV polymerizable monomer itself has the properties of liquid crystal, and has double bond functional groups at two ends.

Furthermore, the photoinitiator can be selected from currently common photoinitiators, such as Irgacure 651, etc. Further, other type of common photoinitiators can be selected according to actual circumstances.

Figure 3:
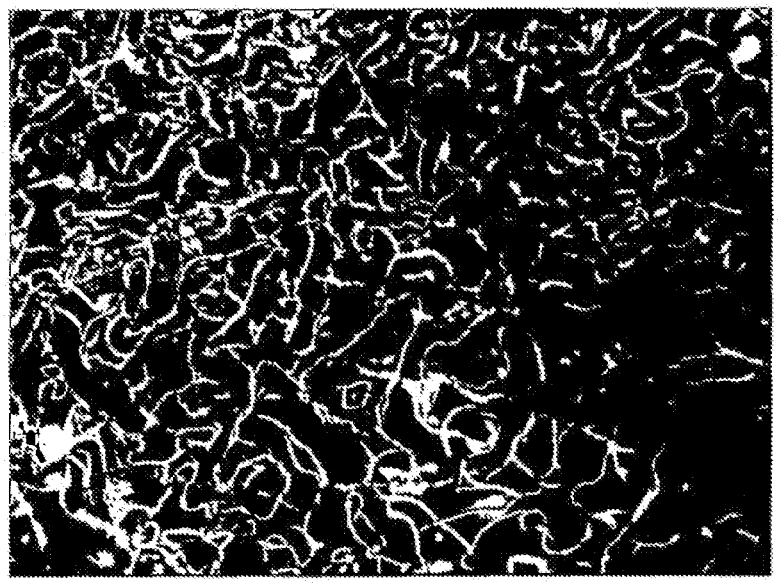
FIG. 3 is the schematic diagram of the liquid crystal mixture obtained by mixing of the negative liquid crystals, UV polymerizable monomers and the photoinitiator observed under a polarizing microscope.

FIG. 3 is a schematic diagram of the liquid crystal mixture obtained after mixing the negative liquid crystals, the UV polymerizable monomers, and the photoinitiator using a polarizing microscope. Under the polarizing microscope, there are obvious nematic liquid crystals with lamellar structure in the liquid crystal mixture. This type of liquid crystal mixture can be applied to the liquid crystal display panel of the modes TN, FFS, IPS, etc.

In this step, for example, the liquid crystal mixture, after agitation, is placed in a defoaming machine for defoaming treatment. The duration of defoaming can be 1 hour~10 hours.

Step 102, sealing the liquid crystal mixture in the liquid crystal cell formed from an array substrate and an opposed substrate to form the liquid crystal display panel.

For example, the liquid crystal mixture is dripped onto the array substrate, and a sealant is coated along the sides of the opposed substrate. The array substrate is assembled together with the opposed substrate to form a liquid crystal cell in vacuum, thereby sealing the liquid crystal mixture in the liquid crystal cell formed from the array substrate and the opposed substrate.

For example, an alignment agent/alignment agents are coated onto the surfaces of the color filter substrate and the array substrate, respectively, followed by rubbing alignment using a piece of cloth, such as plush cloth. The modes of alignment on both substrates are plane alignment. The liquid crystal mixture obtained in step 101 is dripped onto the effective display region of the array substrate, and the sealant is coated in the sealant region on the opposed substrate/array substrate, with the sealant region surrounding the effective display region which is generally in the central portion. The array substrate is assembled together with the color filter substrate in vacuum, thereby providing the liquid crystal display panel. Thereby, the liquid crystal mixture locates within the enclosure space surrounded by the array substrate, the color filter substrate and the sealant, and the long axes of the liquid crystal molecules of the negative liquid crystals in the liquid crystal mixture are in parallel with the substrate. For example, the sealant consists of UV polymerizable monomers and heat polymerizable monomers.

Step 103, radiating the liquid crystal display panel using UV light, and heating the liquid crystal panel.

For example, the liquid crystal panel obtained in step 102 is radiated using UV light. Under the UV radiation and initiation by the photoinitiator, the UV polymerizable monomers in the liquid crystal mixture undergo polymerization to generate a macromolecular network. For example, the intensity of the UV light is 1 Mw/cm$^3$~100 Mw/cm$^3$, and the duration of the UV radiation is 5~60 minutes. At the same time as the UV polymerizable monomers in the liquid crystal mixture undergo polymerization, the UV polymerizable monomers in the sealant also undergo polymerization to prevent the negative liquid crystal in the liquid crystal mixture from diffusing into the sealant.

After UV radiation of the liquid crystal display panel, the liquid crystal display panel needs to be heated by using, for example, an oven. For example, the duration of the heating treatment using the oven is 0.5~3 hours. Further, for example, the duration of the heating treatment using the oven is one hour, and the heating temperature of the oven can be 80° C.~200° C. Furthermore, the heating temperature of the oven can be 100° C. The heating treatment can cause the heat polymerizable monomers in the sealant to polymerize, thereby binding and fixing together the color filter substrate and the array substrate.

After the heat treatment, the whole process for manufacturing the liquid crystal display panel has been completed. This liquid crystal display panel needs subsequent treatments such as testing, etc., which will not be described here for simplicity.

Figure 4:
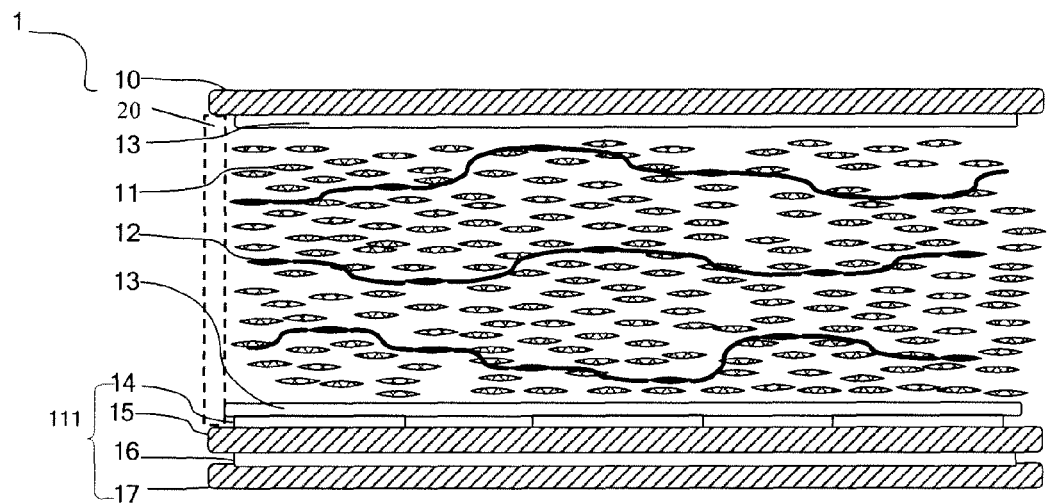

For example, FIG. 4 shows the cross section schematic diagram of the liquid crystal display panel manufactured using negative liquid crystals according to the embodiment of the disclosure before electricity is switched on. As shown in FIG. 4, the liquid crystal display panel 1 is an FFS mode liquid crystal display panel comprising a color filter substrate 10, an array substrate 111 which is opposed to the color filter substrate 10 to form a liquid crystal cell, sealant 20, negative liquid crystals 11, a macromolecular network 12, in which the negative liquid crystal 11 and the macromolecular network 12 are located in the enclosure space surrounded by the color filter substrate 10, the array substrate 111, and the sealant 20. Here the color filter substrate 10 is a specific example of an opposed substrate.

The liquid crystal display panel further comprises the alignment layers 13 located on the opposing surfaces of the color filter substrate 10 and the array substrate 111. The array substrate comprises a common electrode layer 14, an insulated layer 15, a pixel layer 16, and a glass substrate 17.

As shown in FIG. 4, before electricity is switched on for the liquid crystal display panel manufactured using negative liquid crystals, the long axes of the liquid crystal molecules of the negative liquid crystals are all parallel to the substrate after being subjected to plane alignment at the interior side of the liquid crystal display panel. Moreover, because the liquid crystal mixture contains UV polymerizable monomers, a macromolecular network will be generated under UV radiation and initiation by the initiator. This macromolecular network can give rise to an anchoring force which can fix the long axis direction of the liquid crystal molecules.

Figure 5:
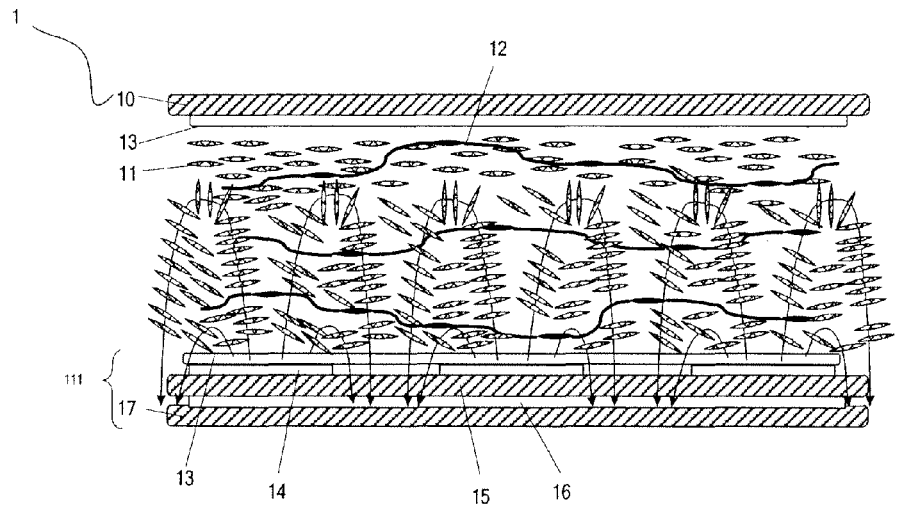

FIG. 5 shows the cross section schematic diagram of the liquid crystal display panel manufactured using negative liquid crystals according to the disclosure after electricity is switched on. Taking a liquid crystal display panel of FFS display mode as an example, as shown in FIG. 5, the electric field lines are parabolic; after electricity is switched on for the liquid crystal display panel, the liquid crystal molecules of the negative liquid crystal 11 will be arranged along the tangential direction of the electric field, and the minor axes of the liquid crystal molecules of the negative liquid crystals 11 are parallel to the tangential direction of the electric field. At this time, the liquid crystal molecules rote, in which the liquid crystal molecules of the negative liquid crystal 11 that are close to the array substrate will be subjected to greater action of the electric filed and thus has a greater rotating angle, while the liquid crystal molecules of the negative liquid crystal 11 that are far from the array substrate will be subjected to smaller action of the electric filed and thus has a smaller rotating angle. After the electric field is removed, because of the anchoring effect of the macromolecular network 12, the liquid molecules of the negative liquid crystal 11 revert back to the state prior to the electricity is switched on, in which the long axes of the liquid crystal molecules are parallel to the substrate. In sum, by switching the electric field on and off, the liquid crystal molecules can rotate and recover, thereby achieving liquid crystal display.

It should be noted that an FFS mode liquid crystal display panel is hereby used as an example to provide the sectional structure of the liquid crystal display panel manufactured using the negative liquid crystals of the embodiments of the disclosure. However, the process for manufacturing the liquid crystal display panel according to the embodiment of the disclosure can also be applied to TN mode or IPS mode liquid crystal display panels. For the TN mode or IPS mode liquid crystal display panels manufactured using the negative liquid crystal according to embodiments of the disclosure, their specific structures can be commonly known structures, but merely the negative liquid crystals and macromolecular network according to the embodiments of the disclosure are formed between the array substrate and the color filter substrate. Therefore, the relevant description is not repeated here for simplicity.

In addition, it should be noted that thin film transistors (TFT) as switching elements, gate lines, data lines, etc. have been formed in pixel units on the array substrate. However, for sake of simplicity, they are not specifically shown or described in the drawings and related description of the present disclosure. Moreover, the position, specific parameters and formation of the TFTs, gate lines and data lines can be selected from those commonly known and are not repeated here.

Figure 6:
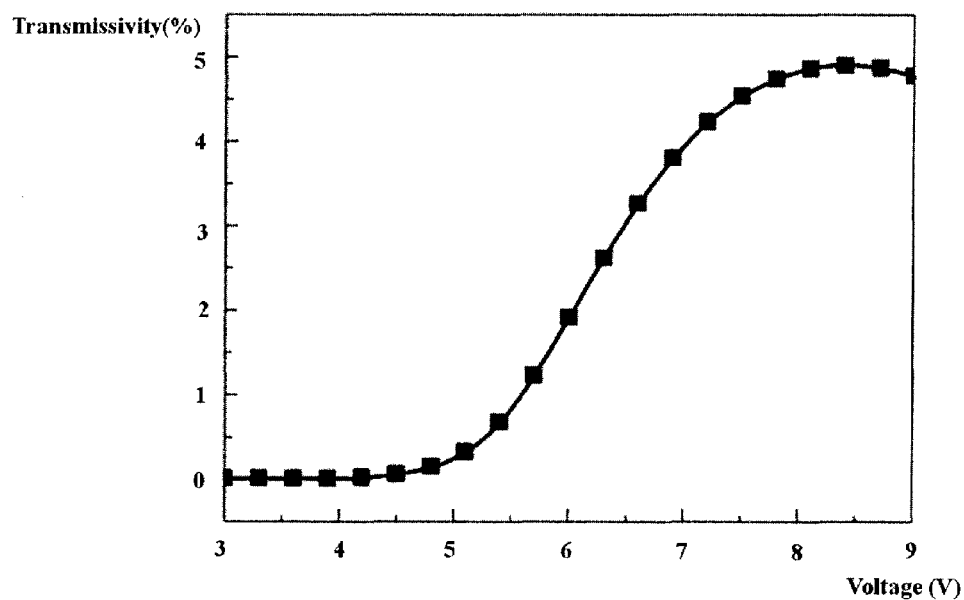
FIG. 6 is the schematic diagram of the voltage vs. transmissivity curve of the liquid crystal display panel according to the embodiment of the disclosure calculated using a simulation software.

FIG. 6 is the schematic diagram of the voltage vs. transmissivity curve of the liquid crystal display panel according to an embodiment of the disclosure calculated through a simulation software. This voltage vs. transmissivity curve can reflect the display performance of the liquid crystal display panel manufactured using the negative liquid crystals of the embodiment. Here, the information such as the parameters of the color filter substrate, the parameters of the array substrate, the parameters of the liquid crystals (for example, for negative liquid crystals, the parameters of the liquid crystals include $\Delta\epsilon=-3$, $\Delta n=0.1$) needs to be input in the simulation software, respectively, thereby calculating out the voltage vs. transmissivity curve of the liquid crystal display panel. For example, the parameters of the color filter substrate and the array substrate are commonly used parameters for the FFS mode liquid crystal display panel. The corresponding parameters can also be obtained by conducting voltage vs. transmissivity simulation on TN mode or IPS mode liquid crystal display panel according to actual circumstances. As shown in FIG. 6, the Y-axis indicates the transmissivity in percentage (%), and the X-axis indicates the voltage in volts (V). From FIG. 6, it can be seen that due to the high viscosity of the liquid crystal molecules, the driving voltage is relatively elevated to close to 8V. After optimizing the viscosity of the liquid crystal molecules, the driving voltage can be reduced. During the exertion of the voltage, the transmissivity of the liquid crystal display panel will increase with the increase of the voltage, but will decrease after passing the peak, with the maximal transmissivity close to 5%. During the reduction of the voltage, the transmissivity of the liquid crystal display panel will decrease with the decrease of the voltage, with the minimal transmissivity close to 0. Therefore, the transmissivity of the liquid crystal display panel will change during display, proving that it is feasible to apply the negative liquid crystals to liquid crystal display panels of the modes such as TN, FFS, or IPS, etc.

In an embodiment the disclosure provides a liquid crystal display panel and a process for preparing the same, in which negative liquid crystals are applied to liquid crystal display panels of the display modes such as TN, FFS, or IPS, etc., to manufacture new liquid crystal panels.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. A process for manufacturing a liquid crystal display panel comprising mixing negative liquid crystals, UV polymerizable monomers, and a photoinitiator to obtain a liquid crystal mixture, wherein the negative liquid crystal is

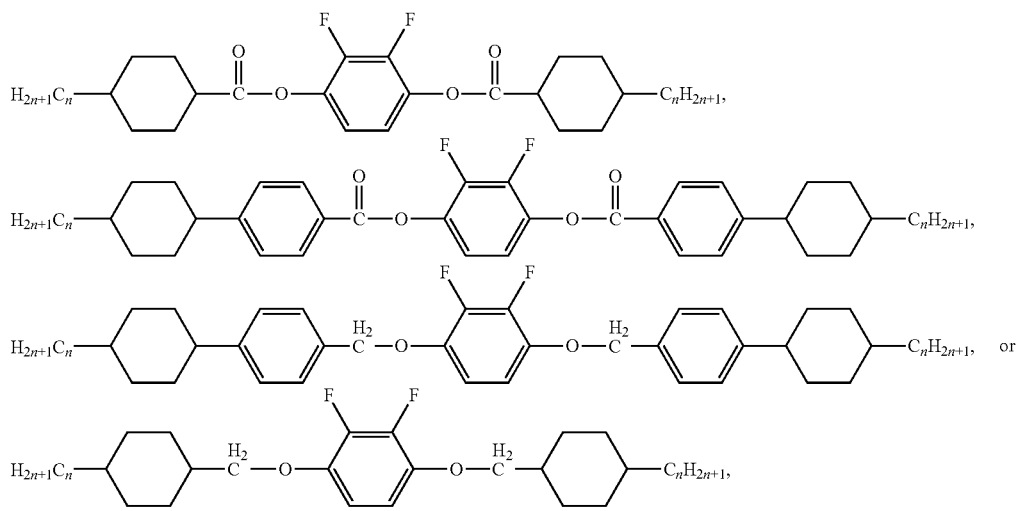

wherein n in the above formulae is 3, 4, 5, 6, 7, or 8;

sealing with a sealant the liquid crystal mixture in a liquid crystal cell formed from an array substrate and an opposed substrate to form the liquid crystal display panel; and radiating the liquid crystal display panel using UV light, and heating the liquid crystal panel.

2. The process according to claim 1, wherein the liquid crystal panel is radiated using UV light; under the UV radiation and initiation by the photoinitiator, the UV polymerizable monomers in the liquid crystal mixture undergo polymerization to generate a macromolecular network; the UV polymerizable monomers in the sealant also undergo polymerization to prevent the negative liquid crystal in the liquid crystal mixture from diffusing into the sealant; and the liquid crystal display panel is heated to cause heat polymerizable monomers in the sealant to polymerize, thereby binding and fixing together the opposed substrate and the array substrate.

3. The process according to claim 2, wherein the intensity of the UV light is 1 Mw/cm³~100 Mw/cm³, and the duration of the UV radiation is 5 min~60 min.

4. The process according to claim 2, wherein the duration of the heating treatment using an oven is 0.5~3 hours; and heating temperature of the oven is 80° C.~200° C.

5. The process according to claim 1, wherein the negative liquid crystals, the UV polymerizable monomers, and the photoinitiator are mixed proportionally to obtain the liquid crystal mixture;

the liquid crystal mixture is agitated away from light; and the liquid crystal mixture, after agitation, is placed in a defoaming machine for defoaming.

6. The process according to claim 1, wherein in the liquid crystal mixture, the negative liquid crystals account for 90%~98% by weight percentage, the UV polymerizable monomers account for 1%~9% by weight percentage, and the photoinitiator account for 0.1%~1% by weight percentage.

7. The process according to claim 1, wherein the UV polymerizable monomer is 1,4-di(4-(6'-propenyloxyhexyloxyl)benzoyloxy)-2-toluene with the following molecular formula:

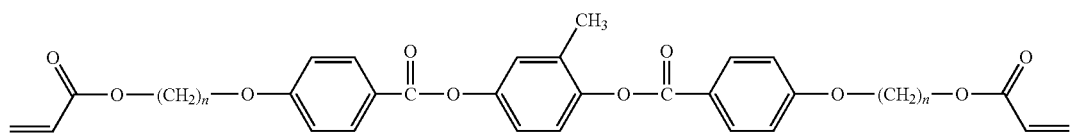

wherein n is 3, 4, 5, 6, 7, or 8.

8. The process according to claim 1, wherein sealing of the liquid crystal mixture in the liquid crystal cell formed from the array substrate and the opposed substrate comprises:

coating an alignment agent on the opposed substrate and the array substrate, respectively, followed by rubbing using a cloth for plan alignment; and dripping the liquid crystal mixture onto an effective display region of opposed substrate/array substrate, and coating sealant in a sealant region of the opposed substrate/array substrate; and wherein the sealant consists of UV polymerizable monomers and heat polymerizable monomers.

9. A process for manufacturing a liquid crystal display panel comprising mixing negative liquid crystals, UV polymerizable monomers, and a photoinitiator to obtain a liquid crystal mixture;

sealing with a sealant the liquid crystal mixture in a liquid crystal cell formed from an array substrate and an opposed substrate to form the liquid crystal display panel; and radiating the liquid crystal display panel using UV light, and heating the liquid crystal panel, wherein sealing of the liquid crystal mixture in the liquid crystal cell formed from the array substrate and the opposed substrate comprises:

coating an alignment agent on the opposed substrate and the array substrate, respectively, followed by rubbing using a cloth for plan alignment; and dripping the liquid crystal mixture onto an effective display region of opposed substrate/array substrate, and coating sealant in a sealant region of the opposed substrate/array substrate; and wherein the sealant consists of UV polymerizable monomers and heat polymerizable monomers.

\* \* \* \* \*